United States Patent Office 3,753,923
Patented Aug. 21, 1973

3,753,923
MANUFACTURE OF EXPANDED VERMICULITE EMPLOYING A UREA COMPOUND AND LOW TEMPERATURES
Takeo Wada, Osaka, Japan, assignor to Takeda Chemical Industries, Ltd., Osaka, Japan
No Drawing. Filed Oct. 4, 1971, Ser. No. 186,448
Claims priority, application Japan, Oct. 12, 1970, 45/89,919
Int. Cl. C04b 2/02
U.S. Cl. 252—378 R         10 Claims

ABSTRACT OF THE DISCLOSURE

Expanded vermiculite is prepared by a process comprising impregnating vermiculite with at least a urea compound selected from the group consisting of urea and thiourea and heating the resulting composition at a temperature not lower than the decomposition point of the urea compound in the composition. The expanded vermiculite has desirable properties and is used in widely varied industrial application.

---

This invention relates to manufacturing an expanded vermiculite. More particularly to say, the present invention relates to an improved process for manufacturing expanded vermiculite by means of heating the unexpanded vermiculite at a relatively low temperature in the presence of a urea compound. The present invention also relates to thus expanded vermiculite which is useful as industrial materials and which has some improved properties as compared with known ones.

"Vermiculite" is a generic designation signifying mica-like minerals belonging to the mica group, and contains water of crystallization between its lamellas. Vermiculite has the property to expand when rapidly heated to a temperature beyond a certain critical level, which has been understood to be about 800° C.

The expanded vermiculite has hitherto been usually obtained by rapidly heating vermiculite ore at a temperature of not lower than 800° C., and it has recently been used in widely varied industrial applications, such as architectural materials, heat insulators, packing materials, etc. by virtue of its light weight and heat-insulating and sound absorption properties. It has also been known that vermiculite can be expanded by the treatment with hydrogen peroxide in a laboratory scale.

The present inventor has now unexpectedly found that vermiculite is easily allowed to expand by impregnating vermiculite with at least an urea compound selected from the group consisting of urea and thiourea and heating the resulting composition at a temperature not lower than the decomposition point of the urea compound in the composition.

The present inventor has also found that the expanded vermiculite manufactured by the use of the urea compound possesses some additional qualities which are not found in the vermiculite expanded by rapid heating, namely, ion exchangeability, humidity control property and high water holding capacity, besides its light weight, sound absorption and heat insulation properties and attractive appearance which are also observed in the vermiculite expanded by rapid heating.

The expanded vermiculite is usually obtained in the form of granules, and the granules are often combined with polymers (e.g. unsaturated polyester resins, urethane type resins, etc.) into shapes such as boards or blocks. The present inventor has now unexpectedly found that boards and blocks made from the expanded vermiculite of the present invention have remarkably been improved in their light weight, sound absorption and heat insulation properties as compared with those made from the hitherto known expanded vermiculite. The increase of those properties depends upon conditions of the reaction for the expansion, but it is usually in a range from about 1.2 to 1.4 time.

Therefore, it is the main object of the present invention to provide an industrially advantageous process for manufacturing the expanded vermiculite.

Another object of the preesnt invention is to provide an expanded vermiculite which has the desirable properties and are used in widely varied industrial applications (e.g. architectural materials, heat insulators, sound absorption materials, etc.).

Said objects are realized by impregnating vermiculite with at least an urea compound selected from the group consisting of urea and thiourea and heating the resulting composition at a temperature not lower than the decomposition point of the urea compound in the composition.

In accordance with the present invention, expanding process can be applied to unexpanded vermiculite as well as vermiculite material which is incompletely expanded by other methods such as rapid heating or the treatment with hydrogen peroxide. Therefore, it is to be noted that the wording "vermiculite" is intended to include unexpanded vermiculite (i.e. vermiculite ore) and incompletely expanded vermiculite throughout the specification and claims.

The urea compound may be urea, thiourea or a mixture thereof. The urea compound may be employed in the form of an addition compound of the urea compound with a mineral acid (e.g., phosphoric acid, sulfuric acid, nictric acid, etc.), an organic acid (e.g. acetic acid, tartaric acid, malonic acid, etc.) or the salts of the mineral acid or the organic acid (e.g. calcium nitrate, sodium nitrate, magnesium sulfate, zinc chloride, sodium acetate, etc.) or in the form of an inclusion compound of the urea compound with normal paraffin (e.g. octane, decane, tetradecane, hexadecane or octadecane, etc.), alcohol (e.g. 1-octanol, 1-decanol, 1-hexadecanol, 1-octadecanol, etc.) or carboxylic acid (e.g. caprylic acid, n-capric acid, palmitic acid, stearic acid, etc.).

While the size of vermiculite depends upon the use to which the final expanded vermiculite will be put, it is advisable to employ vermiculite in average size of from about 1 to 10 millimeters, more desirably about 1 to 8 millimeters, in at least two dimensional directions.

Impregnation of vermiculite with the urea compound is usually carried out by adding vermiculite into a melt of the urea compound, immersing vermiculite in a solution of the urea compound in an inert solvent or admixing vermiculite with a suspension or a paste of the urea compound. Such a solvent for the solution, suspension or paste is exemplified by water or an alkanol (e.g. methanol, ethanol or the like). When urea is employed as the urea compound, it is recommended to use urea in the form of a melt, and when thiourea or a mixture of urea and thiourea is employed as the urea compound, the use of a solution, a suspension or a paste thereof is recommended for the better result.

The amount of the urea compound relative to vermiculite is variable, but it is usually about 0.1 mol or higher, preferably about 1 mol or higher per kilogram of vermiculite. In an usual way, it is recommended that the amount of the urea compound is not more than about 20 mols per kilogram of the vermiculite employed, because the excess amount over 20 mols is superfluous in respect of the expansion of vermiculite.

In case where the urea compound is employed in the form of a solution, a suspension or a paste, the concentration of the urea compound in the mixture (i.e. solution, suspension or paste) is not critical for the effect of the expansion of vermiculite. But for the purpose of compact procedure and low production cost, the concentration of the urea compound falls in a range from about 10 to 95 weight percent, preferably about 16.6 to 90 weight percent.

The mere contact of vermiculite with the melt or the mixture of the urea compound immediately causes impregnation of vermiculites with the urea compound to give a composition of vermiculite and the urea compound.

The resulting composition is heated at a temperature not lower than the decomposition point of the urea compound in the composition. In the presence of the vermiculite, urea or/and thiourea begin to decompose at about 150° C. For better expansion of vermiculite, the vermiculite impregnated with the urea compound is heated at a temperature higher than about 160° C. However, care must be taken not to heat up to such a high temperature as 720° C., otherwise the humidity control and ion exchange capacity of expanded vermiculite will be impaired. Further, from a practical view point, the heating temperature is usually set in a range from about 160° to 300° C., preferably from about 200° to 250° C.

The time for heating the vermiculite composition varies with the type and size of vermiculite, the amount of the urea compound, the heating temperature or other conditions, the expansion of vermiculite is usually completed in a period of time from 10 minutes to 1 hour.

Any heating means may be employed, exemplary means including an oil bath, an electric furnace and a rotary kiln.

While the degree of expansion is dependent upon the type and amount of the urea compound and the heating temperature and time selected, vermiculite ore is usually expanded about 5 to 20 times its original volume by the above process.

Following are presently preferred illustrative embodiments of this invention. In these examples, the parts by weight bear the same relationship to parts by volume as do grams to milliliters.

EXAMPLE 1

An iron container is filled with 400 parts by weight of urea and heated to 140° C. When the urea has been completely melted, 1,000 parts by weight of vermiculite (about 3 millimeters square; sold by Parabora Mining Co., South African Republic) is charged. The mixture is stirred to an even blend and, after putting on the lid, the vessel is heated at 200° C. for 30 minutes, whereupon the composition expands to 14,000 parts by volume, with the evolution of ammonia gas.

A 100 grams sample of the expanded vermiculite is quickly taken and placed in a desiccator kept at 20° C. and 95% relative humidity by the use of saturated aqueous solution of $Na_2HPO_4 \cdot 12H_2O$. After 1 hour, the sample weighs 118 grams. The sample is placed in a desiccator containing phosphorus pentoxide and, then, decompressed for 3 hours. Now, the sample weighs 100 grams which is its original weight. This fact indicates that the product has an excellent humidity control action.

EXAMPLE 2

300 parts by weight of urea is blended with 200 parts by volume of water, and after the former is completely dissolved under heating, 1,000 parts by weight of hydrobiotite (the vermiculite produced in Ono-machi, Hukushima Prefecture, Japan) is added. After thorough blending, the composition is charged into an iron container of 10,000 parts by volume capacity, which is fitted with a lid. The container is placed in a furnace which has been heated to 220° C. After 30 minutes' standing, the container is found to be full of expanded vermiculite up to its capacity.

EXAMPLE 3

In 100 parts by volume of water is dissolved 62 parts by weight of urea-nitric acid addition compound $$(NH_2-CO-NH_2 \cdot NHO_3),$$

and 100 parts by weight of vermiculite (about 5 millimeters square) is added. While stirring, the composition is heated to 200° C., at which temperature it is allowed to stand for 40 minutes, whereupon the system expands to 12,000 parts by volume.

EXAMPLE 4

100 parts by weight of vermiculite is put into mixture of 40 parts by weight of urea and 30 parts by volume of water and the composition is thoroughly mixed. Then, the composition is placed in a glass container fitted with a lid and heated at 200° C. for 30 minutes, whereupon the system expands to 1,550 parts by volume.

A sample (98 grams of thus expand vermiculite) is immediately placed in a desiccator at 95% relative humidity and 20° C. After 1 hour, the sample weighs 115 grams. As a control, the expanded vermiculite produced by heating 100 grams of the same vermiculite as above at a temperature 950° C. in the conventional manner is also placed in a desiccator at 95% relative humidity and 20° C. After one hour, this sample weighs 101 grams.

EXAMPLE 5

390 parts by weight of thiourea is well blended with 200 parts by volume of water to make a paste. The paste is added to 1,000 parts by weight of vermiculite (about 5 millimeters square). After thorough blending, the composition is charged into an iron container of 10,000 parts volume capacity, which is fitted with a lid. The container is placed in a furnace which has been heated to 220° C. After 40 minutes' standing, the vermiculite is expanded up to 12,000 parts by volume.

In the above method, a mixture of 150 parts by weight of urea and 195 parts by weight of thiourea is used instead of 390 parts by weight of thiourea, and substantially the same result is obtained.

The expanded vermiculite produced by the present invention is made into a composite board, a roofing and siding material or an insulating material by means of per se known manner as, for example, described in any of U.S. Pat. Nos. 3,109,767, 3,207,619 and 3,015,626.

What is claimed is:

1. A process for manufacturing expanded vermiculite which comprises impregnating vermiculite with urea or thiourea or a mixture thereof in an amount of 0.1 mol or higher per kilogram of vermiculite, and heating the resulting composition at a temperature of about 160° C. to 300° C.

2. A process as claimed in claim 1, wherein urea is employed.

3. A process as claimed in claim 1, wherein thiourea is employed.

4. A process as claimed in claim 1, wherein the amount of urea or thiourea or mixture thereof relative to vermiculite is in a range from 0.1 mol to 20 mols per kilogram of vermiculite.

5. An expanded vermiculite which is manufactured by impregnating vermiculite with urea or thiourea or a mixture thereof in an amount of 0.1 mol or higher per kilogram of vermiculite, and heating the resulting composition at a temperature of about 160° C. to 300° C.

6. An expanded vermiculite as claimed in claim 5, wherein urea is employed.

7. An expanded vermiculite as claimed in claim 5, wherein thiourea is employed.

8. An expanded vermiculite as claimed in claim 5, wherein the amount of urea or thiourea or mixture thereof relative to vermiculite being in a range from 0.1 mol to 20 mols per kilogram of vermiculite.

9. A process as claimed in claim 1, wherein the amount of the urea, thiourea or a mixture thereof relative to vermiculite is 1 mol or higher per kilogram of vermiculite.

10. An expanded vermiculite as claimed in claim 5 wherein the amount of the urea, thiourea or a mixture thereof relative to vermiculite is 1 mol or higher per kilogram of vermiculite.

References Cited
UNITED STATES PATENTS

| | | | |
|---|---|---|---|
| 3,118,658 | 1/1964 | Dennert | 252—378 R |
| 2,693,018 | 11/1954 | Czarnecki | 252—378 R |
| 3,397,151 | 8/1968 | Payment | 252—378 R |
| 2,564,978 | 8/1951 | Hyde et al. | 106—41 |
| 3,459,531 | 8/1969 | Chapin Jr. et al. | 252—378 R |
| 3,677,939 | 7/1972 | Patil et al. | 210—37 |
| 3,356,611 | 12/1967 | Walker et al. | 252—378 R |

PATRICK P. GARVIN, Primary Examiner

P. E. KONOPKA, Assistant Examiner

U.S. Cl. X.R.

106—DIG. 3; 252—62